R. H. NORRIS.
Window-Pulleys.
No. 148,081. Patented March 3, 1874.
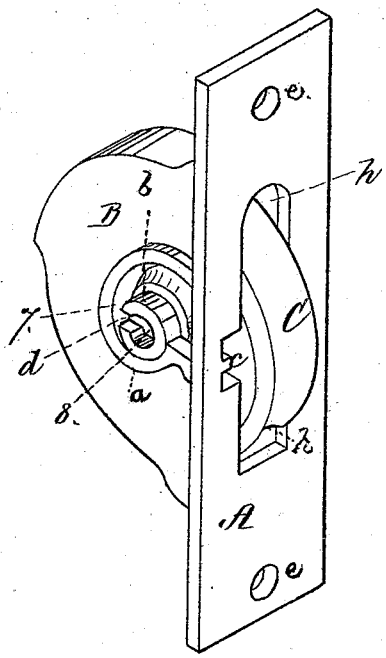
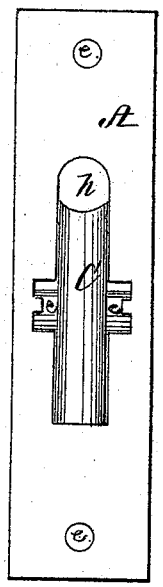
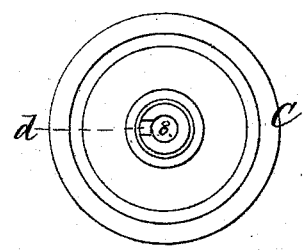
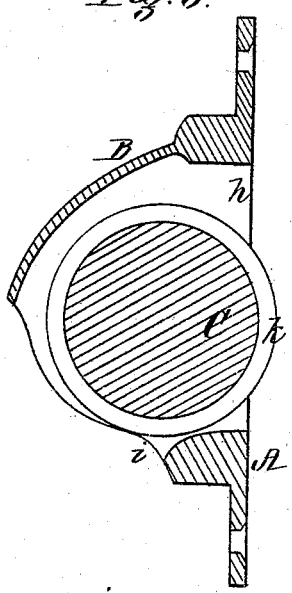
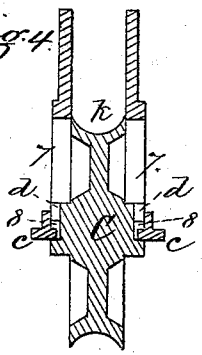
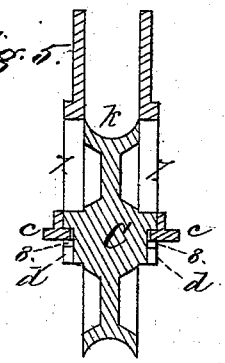
Witnesses,
N. W. Stearns
N. J. Cambridge
Inventor,
Reuben H. Norris

UNITED STATES PATENT OFFICE.

REUBEN H. NORRIS, OF CHELSEA, ASSIGNOR TO HIMSELF AND DWIGHT B. RICH, OF BOSTON, MASSACHUSETTS.

IMPROVEMENT IN WINDOW-PULLEYS.

Specification forming part of Letters Patent No. 148,081, dated March 3, 1874; application filed February 9, 1874.

*To all whom it may concern:*

Be it known that I, REUBEN H. NORRIS, of Chelsea, in the county of Suffolk and State of Massachusetts, have invented certain Improvements in Window-Pulleys, of which the following is a full, clear, and exact description, reference being had to the accompanying drawings, making part of this specification, in which—

Figure 1 is a perspective view of my improved window-pulley, inclosed within its casing. Fig. 2 is an elevation of the face of the same. Fig. 3 is a section on the line $x\ x$ of Fig. 2. Figs. 4 and 5 are transverse sections on the line $y\ y$, representing the pulley in two positions. Fig. 6 is a plan of my improved pulley detached.

Window-pulleys of the ordinary construction are objectionable for the reason that when a new cord is to be attached to the weight which balances the sash, a difficulty is experienced in passing the cord over the pulley and conducting it down to the weight at the bottom of the space or box at the side of the sash. To obviate this difficulty is the object of my invention, which consists in a casing provided with slotted bearings opening out to the face-plate, which is provided with one or more projections extending into the entrance of the space therein leading to the bearings in the casing, in combination with a pulley, the arbor of which is so constructed that a partial revolution of the pulley will bring it into a position to allow of its removal, when the cord may be passed down through the empty casing, and when secured to the weight have only to be slightly raised to enable the pulley to be passed thereunder through the opening in the face-plate, after which a partial revolution of the pulley will bring it into a position where it is free to be again seated in its bearings, the whole operation of attaching the cord to the weight being performed with great ease and rapidity.

To enable others skilled in the art to understand and use my invention, I will proceed to describe the manner in which I have carried it out.

In the said drawings, A represents the face-plate, to the back of which is secured the shell or casing B, the opposite sides of which are provided with slots 7 7, the inner portions of which are curved downward, and form bearings $a\ a$ for the ends of the arbor $b$ of the pulley C to revolve in. The slots 7 7 extend out to the face-plate, the middle of the opening to each slot therein being provided with a projection, C, which prevents the accidental escape of the pulley should it be unseated from its bearings, and its arbor come into contact therewith. Each end of the arbor of the pulley is, however, provided with a notch or groove, $d$, which, on being brought in line with its projection $c$, allows the pulley to be slightly drawn forward until the central portion 8 of the arbor (which is recessed out) is brought in line with the projection, when, on the pulley being turned a half-revolution, it is free to be removed.

When a cord breaks, and a new one is required, the operation of attaching it to the weight and replacing the pulley is as follows: The casing being secured in place by screws passing through holes $e\ e$ in the face-plate, the end of the cord to be attached to the weight is entered within the slot $h$ in the face-plate, and passed down through the opening $i$ usually formed between the sides of the casing, near their lower ends, the cord continuing to be fed down till it reaches the weight at the bottom of the box or hollow space on the side of the sash. After being attached to the weight, the cord is raised to the top of the slot $h$ in the face-plate, when the pulley is taken up and entered therein, and passed under the cord, to allow it to rest in its groove $k$, the pulley being held in such position that each of the notches $d$ will be brought up to and in line with its projection $c$ on the face-plate, when the pulley may be pressed in till the projections $c\ c$ and the enlarged portions of the notches $d$, at the centers of both ends of the arbor, are in line, after which a half-revolution of the pulley will bring the notches $d$ on the inside of the casing into a position for allowing the pulley to be replaced within its bearings.

It will be seen from the foregoing that by the employment of a pulley constructed in accordance with my invention, I am enabled to remove it, connect the cord with the weight, and return the pulley within its casing in an extremely ready and convenient manner.

What I claim as my invention, and desire to secure by Letters Patent, is—

The pulley C, with its notched arbor B, and the casing B, with its slotted bearings $a\ a$, in combination with the slotted face-plate A, having projections $c\ c$, substantially as described, for the purpose set forth.

Witness my hand this 31st day of January, A. D. 1874.

REUBEN H. NORRIS.

In presence of—
P. E. TESCHEMACHER,
N. W. STEARNS.